United States Patent
Cagney et al.

(10) Patent No.: US 7,509,890 B2
(45) Date of Patent: Mar. 31, 2009

(54) NON-HOMOGENEOUS ENGINE COMPONENT FORMED BY POWDER METALLURGY

(75) Inventors: John L. Cagney, Downers Grove, IL (US); Donald R. Van Der Moere, Spencer, IN (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 647 days.

(21) Appl. No.: 10/855,117

(22) Filed: May 27, 2004

(65) Prior Publication Data
US 2005/0266260 A1    Dec. 1, 2005

(51) Int. Cl.
*F16C 3/04* (2006.01)
(52) U.S. Cl. .................................. 74/595
(58) Field of Classification Search ............... 74/595, 74/596, 597, 598, 603
See application file for complete search history.

(56) References Cited

U.S. PATENT DOCUMENTS

| | | | |
|---|---|---|---|
| 4,419,413 A | 12/1983 | Ebihara | |
| 4,779,316 A * | 10/1988 | Cherry et al. | 74/603 |
| 5,972,071 A | 10/1999 | Koike et al. | |
| 6,070,323 A | 6/2000 | Koike et al. | |
| 6,135,727 A * | 10/2000 | Dreiman et al. | 417/415 |
| 6,279,455 B1 | 8/2001 | Kruse | |
| 6,318,243 B1 | 11/2001 | Jones | |
| 6,363,608 B1 | 4/2002 | Koike et al. | |
| 6,435,077 B1 | 8/2002 | Damour et al. | |
| 6,477,941 B1 | 11/2002 | Zhu et al. | |
| 6,626,576 B1 | 9/2003 | Cadle et al. | |
| 6,825,450 B2 | 11/2004 | Ribeiro et al. | |
| 6,845,807 B1 * | 1/2005 | Baltz et al. | 164/28 |

FOREIGN PATENT DOCUMENTS

| | | |
|---|---|---|
| DE | 3305879 A1 | 8/1984 |
| DE | 4307560 A1 | 9/1994 |
| GB | 2 070 068 A | 9/1981 |
| JP | 2001335814 A | 12/2001 |
| JP | 2002130048 A | 5/2002 |
| JP | 06330106 A | 11/2002 |

OTHER PUBLICATIONS

Kemnitz et al; "Monotherm, a New Forged Steel Piston Design for Highly Loaded Diesel Engines," SAE Technical Paper Series 2000-01-0924, Mar. 6-9, 2000.

* cited by examiner

*Primary Examiner*—Vicky A Johnson
(74) *Attorney, Agent, or Firm*—Jack D. Nimz; Jeffrey P. Calfa

(57) ABSTRACT

A crankshaft has a non-homogenous structure is unitarily formed in a powder metallurgy process with at least two different metallic constituents providing dissimilar characteristics at discrete locations of the structure.

5 Claims, 9 Drawing Sheets

NON-HOMOGENEOUS ENGINE COMPONENT FORMED BY POWDER METALLURGY

FIELD OF THE INVENTION

The present invention relates to components formed by powder metallurgy and, more specifically, to a method and apparatus for forming components by powder metallurgy.

BACKGROUND OF THE INVENTION

Powder metallurgy is a common manufacturing method used to produce components of high quality for applications such as engines. Powder metallurgy is often employed in the manufacture of engine components because it is economical, flexible, and can produce a finished part that requires less machining or secondary processing than other methods of forming components. Powder metallurgy allows for a component to be formed of a wide variety of alloys, composites, and other materials to provide the finished component with desirable characteristics. Powder metallurgy is well suited to manufacture parts of a wide range of sizes and shapes. Also, powder metallurgy can reliably produce parts with consistent dimensions and advantageous physical properties.

Referring to FIG. 1, a process chart for the conventional powder metallurgical component forming process 30 is shown. First, the metal powders 32 that comprise the component are provided. Often, lubricants are added to the metal powders to decrease the wear of pressing machinery. Next, the base powders are mixed 34 to form a homogenous mixture. The finished part is ultimately a homogeneous alloy of the constituent metal powders.

A mold or die is then filled 36 with the mixed powders. The die, when closed, has an internal cavity somewhat similar in shape to the final part. The powder is compressed 38 within the die to form a so-called "green part." The compaction 38 is usually performed at room temperature and at pressures, for example, in the range of 30-50 tons per square inch. The green part, also referred to as a "green compact," has the desired size and shape for the next operation when ejected from the die. After compaction 38, the green part has sufficient strength for further processing.

The green part is subjected to a sintering process 40. A variety of secondary operations 42 may be performed on the part after sintering 40, depending on its intended use, the process yielding a finished part 44.

Generally, sintering 40 involves subjecting the green part to a temperature, for example, of 70-90% of the melting point of the metal or alloy comprising the green part. The variables of temperature, time, and atmosphere are controlled in the furnace to produce a sintered part having improved strength due to bonding or alloying of the metal particles. The sintering process 40 generally comprises three basic steps conducted in a sintering furnace: burnoff 46, sinter 48, and cooling 50. Continuous-type sintering furnaces are commonly used to perform these steps. The burnoff chamber is used to volatize the lubricants used in forming green part 46. The high-temperature chamber performs the actual sintering 48. The cooling chamber cools the sintered part prior to handling 50.

The parts that exit the sintering furnace 40 after cooling 50 may be considered complete. Alternatively, they may undergo one or more secondary operations 42. Secondary operations include, for example, re-pressing (forging) the component 52, machining 54, tumbling 56, and joining the component with additional components 58 as part of an overall assembly. The secondary operations 42 may also include the impregnation of oils or lubricants 60 into the part for conveying self-lubricating properties. The sintered component may also undergo heat treatment 62 to provide certain characteristics and properties to the component, such as strength. Those skilled in the art will recognize that other secondary operations may be performed. The secondary operations 42 may be performed individually or in combination with other secondary operations. Once all the secondary operations 42 are performed, the component or part 44 is finished.

U.S. Pat. Nos. 5,303,468, 5,195,398, and 3,748,925 disclose crankshafts for use in an internal combustion engine.

FIG. 2 illustrates the internal detail of a conventional internal combustion engine to illustrate the use of a crankshaft 72. A connecting rod 64 is pivotally connected to a piston 66 and the crankshaft 72. The connecting rod 64 is connected to the crankshaft 72 at a large or crank end 76. The large end 76 of the rod 64 receives a shaft portion ("crank pin") 78 of the crankshaft 72. The connecting rod 64 is further connected to a piston 66 at a small or piston end 70 of the rod 64. The crankshaft 72 comprises a counterweight 74 disposed between the crankpins 78.

Referring to FIG. 3 and FIG. 4, a conventional crankshaft 72, manufactured according to conventional methods, is shown. Crankshaft 72 comprises a longitudinally extending body 83 between a first end 80 and a second end 82. The body 83 defines an axis or rotation 84 for the crankshaft, when rotating in the engine. A main journal 86 is provided at each of the first end 80 and second end 82 for supporting the shaft 72 in the engine block. The body 83 includes a plurality of bearing journals 88, crank pin journals 90 and counterweights 74.

The mass of the crank pin journals 90 when coupled with a connecting rod 64 defines an offset balance axis 92. The balance axis 92 is the axis of rotation through which the forces generated by rotation of the shaft and connecting rod assembly are balanced. The axis of rotation 84 is offset from the axis of balance 92. The offset creates a moment when the crankshaft is rotating. The moment is undesirable because it increases loading on the shaft bearings and minimizes oil film thickness between the journals of the crankshaft and their respective bearings. This limits the load carrying capacity of the main journals.

A conventional solution is to provide a plurality of counterweights 78 to the shaft 72 to shift the axis of balance 92 towards the axis of rotation 84. Ideally, the counterweights 78 are located 180 degrees opposite each crankpin journal 90. Such configuration results in an undesirably large crankshaft 72. Engine designers are constantly striving to minimize engine size and increase engine efficiency. Larger crankshafts necessitate larger engine size. Moreover, larger crankshafts also increase the rotational inertia of the engine, thereby reducing efficiency.

U.S. Pat. No. 5,195,398 discloses one method of addressing the balance versus crankshaft size issue. This patent discloses offsetting one or more of the counterweights with respect to the crankpin journals to form an asymmetric counterweight configuration. The asymmetric arrangement strikes a balance between oil film thickness, crankshaft mass and packaging constraints. The asymmetric design, however, suffers from packaging limitations. The design also has the same disadvantages present in the unbalanced crankshaft and connecting rod assembly, albeit to a reduced degree.

Therefore, there is a need for a method of providing crankshaft that minimizes costs while providing for adequate balance.

SUMMARY OF THE INVENTION

A crankshaft includes a non-homogenous structure unitarily formed in a powder metallurgy process with at least two different metallic constituents providing dissimilar characteristics at discrete locations of the structure. A method of forming the crankshaft is provided.

DETAILED DESCRIPTION

Figure 5:
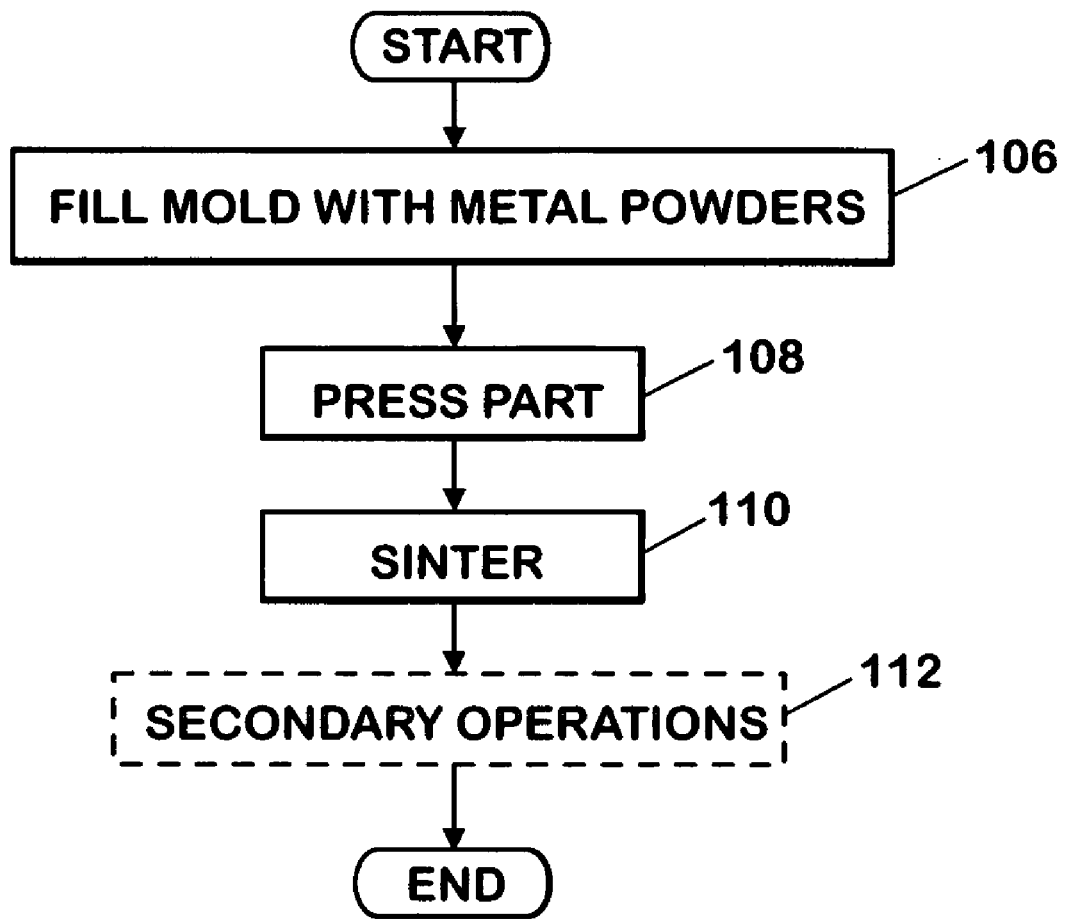
FIG. 5 is a process flowchart for fabricating a non-homogenous component using the powder metallurgy manufacturing process in accordance with the present invention.

FIG. 5 illustrates a process for manufacturing a non-homogenous powder metallurgical manufactured component, including a crankshaft 280. One or more metal powders are introduced into a mold at step 106. Two, three, or more metal powders may be introduced simultaneously (in parallel), at different times (in series), or in some combination thereof. Each metal powder may be a mixture of constituents. The metal powders may be mixed prior to introduction, except as desired for a non-homogeneous result. At step 108, the powder in the mold is pressed to form a green part. The green part is sintered at step 110. Optionally, one or more secondary operations, such as forging, machining, heat treating, finishing, and so forth are performed at step 112. Those skilled in the art will recognize that additional layering of powdered metals and/or process steps may be performed without deviating from the spirit and scope of the present invention.

Figure 6:
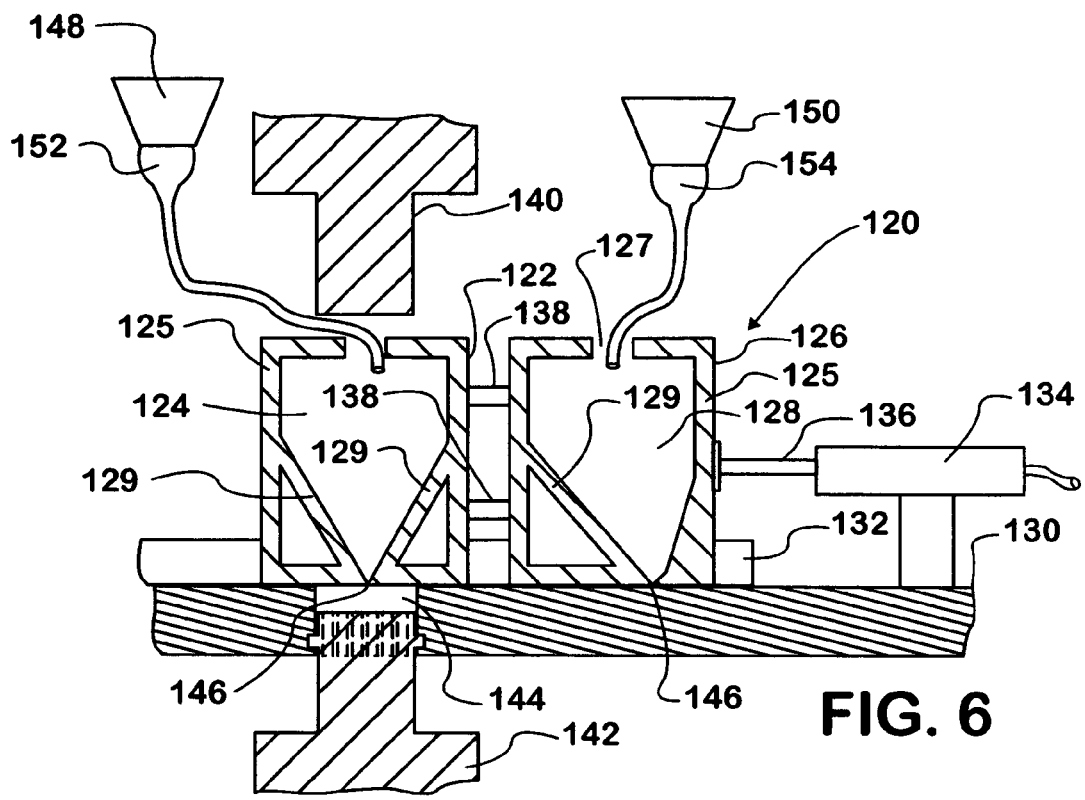
FIG. 6 is a side cutaway view of the green part forming apparatus in accordance with the present invention.

One embodiment of a green component forming apparatus 120 is shown in FIG. 6. The green part forming apparatus 120 may be referred to generally as a feedshoe apparatus 120. The feedshoe apparatus 120 generally comprises a powder filling vessel 122 actuatable by an actuator cylinder 134, an upper punch 140, a lower punch 142, and a powder hopper 148. More particularly, a first vessel 122 is rigidly connected to a second vessel 126 by one or more connection members 138. The second vessel 126 is connected to an actuator cylinder 134 via a piston 136. The actuator cylinder 134 may be a hydraulic or pneumatic cylinder for urging the piston 136 in or out, thereby guiding first 124 and second 125 vessels in a controlled movement. Each vessel 124, 126 comprises side walls 125 defining an interior cavity 124, 128 therein. The side walls 125 have sloped portions 129 for directing powder towards a powder outlet valve 146. A top opening 127 in the vessel 122, 126 is sized to receive a chute 152, 154 connected to hopper 148, 150. The hoppers 148, 150 receive a respective first and second powdered metal that are provided to a respective first interior cavity 124 and second interior cavity 128. The first chute 152 and second chute 154 comprise a flexible tube configured to allow for the linear movement of the first vessel 122 and second vessel 126. Both first and second vessels 122, 126 move linearly by sliding on bridge member 132. Each of the bridge member 132 and actuator cylinder 134 are mounted on a die table 130.

Figure 7:
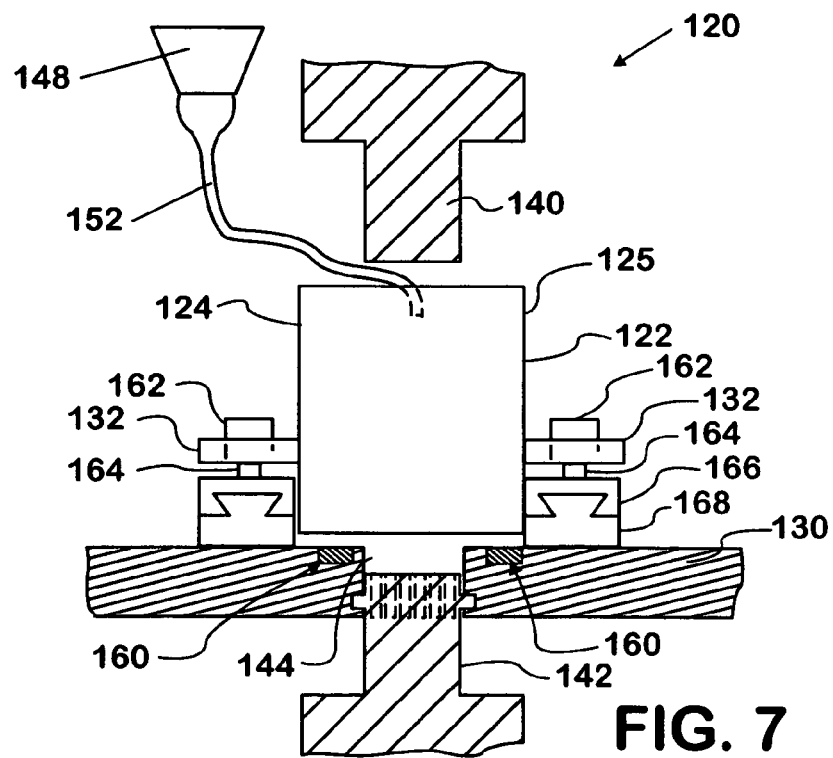
FIG. 7 is a front view of a green part forming apparatus in accordance with the present invention.

A side view of the feedshoe apparatus 120 is shown in FIG. 7. One or more locking mechanisms 160 are provided to the die table 130. The locking mechanisms 160 allow for registration of the vessels 122, 126 during a die cavity 144 filling operation. The locking mechanism 160 may be a magnet or other locking means such as a male-female socket or equivalent thereto.

Figure 1:
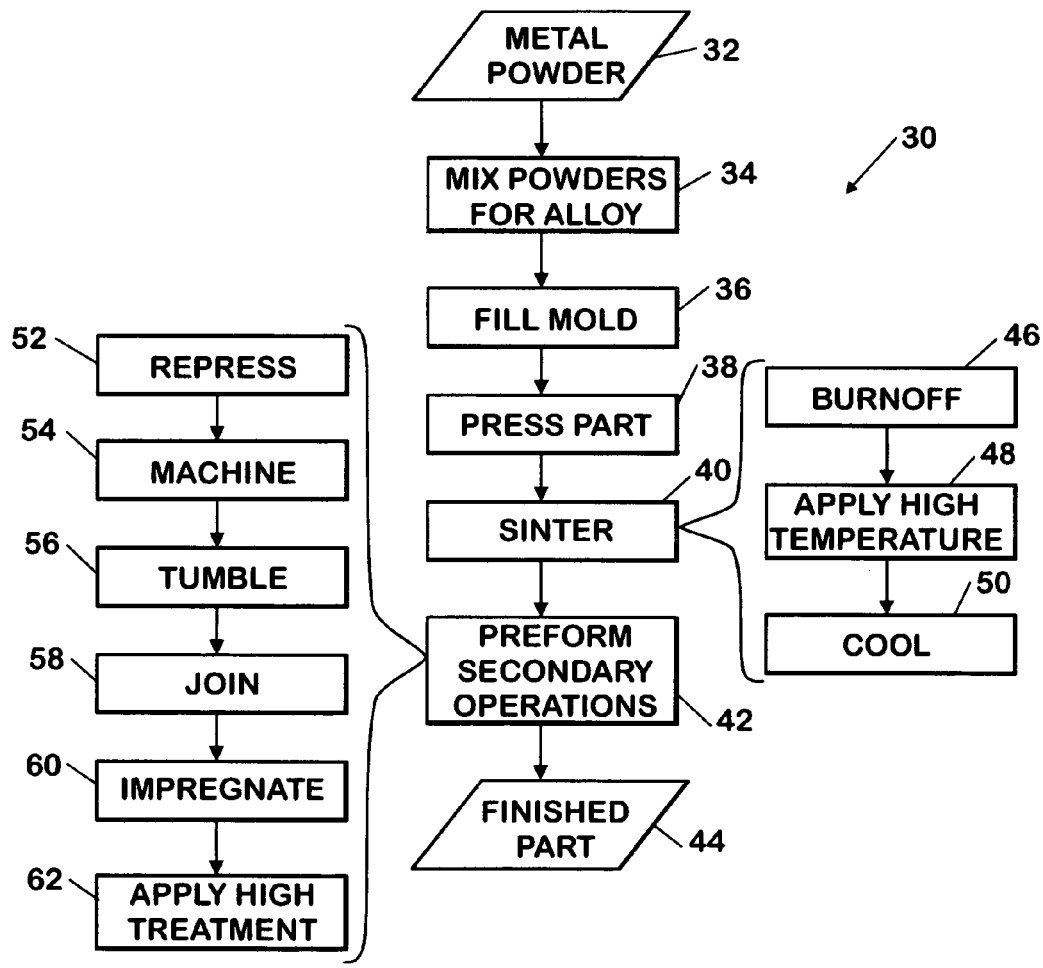
FIG. 1 is a process flowchart for a powder metallurgy manufacturing process according to the prior art.
Figure 2:
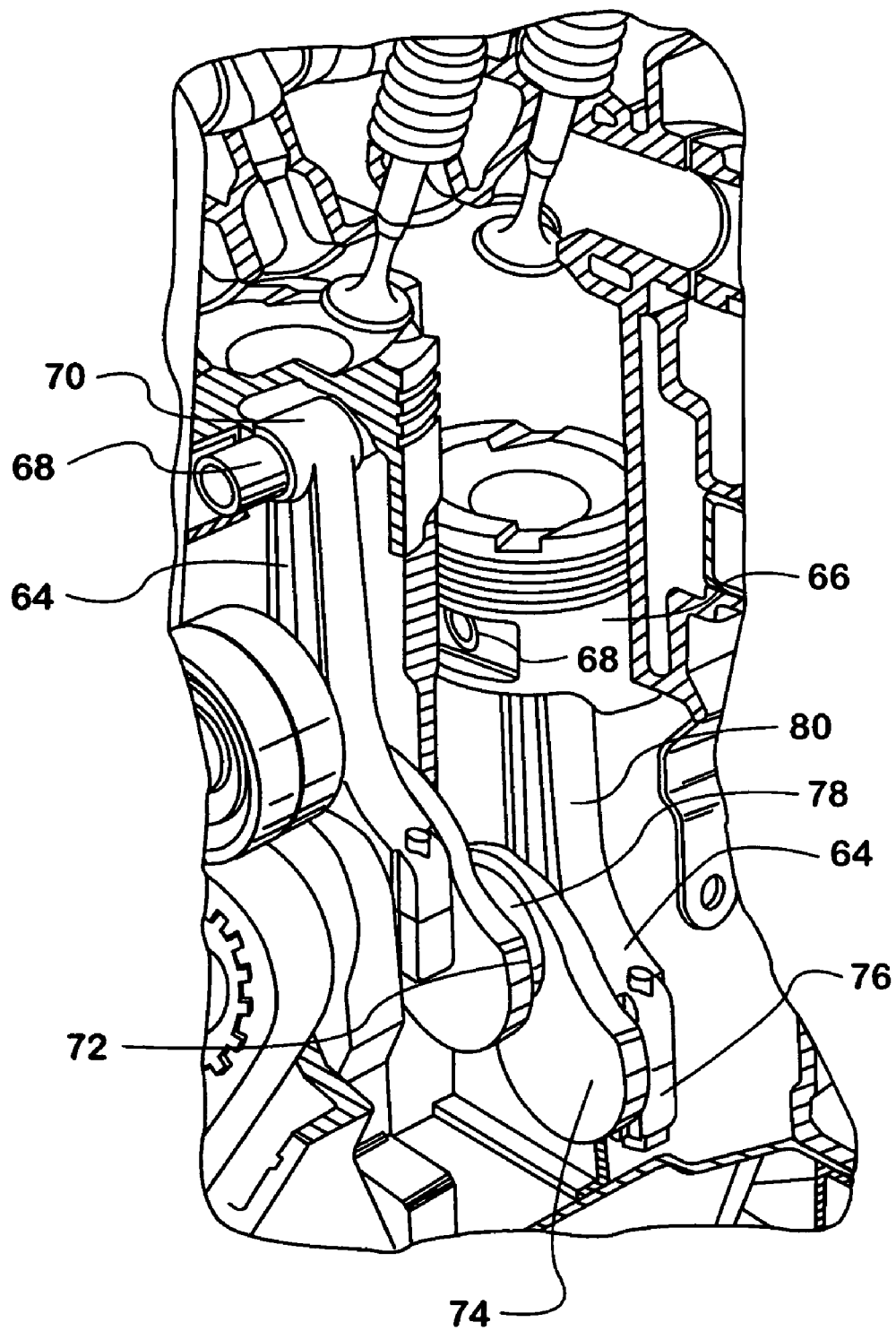
FIG. 2 is a partial cutaway perspective view of a vehicular engine according to the prior art.
Figure 3:
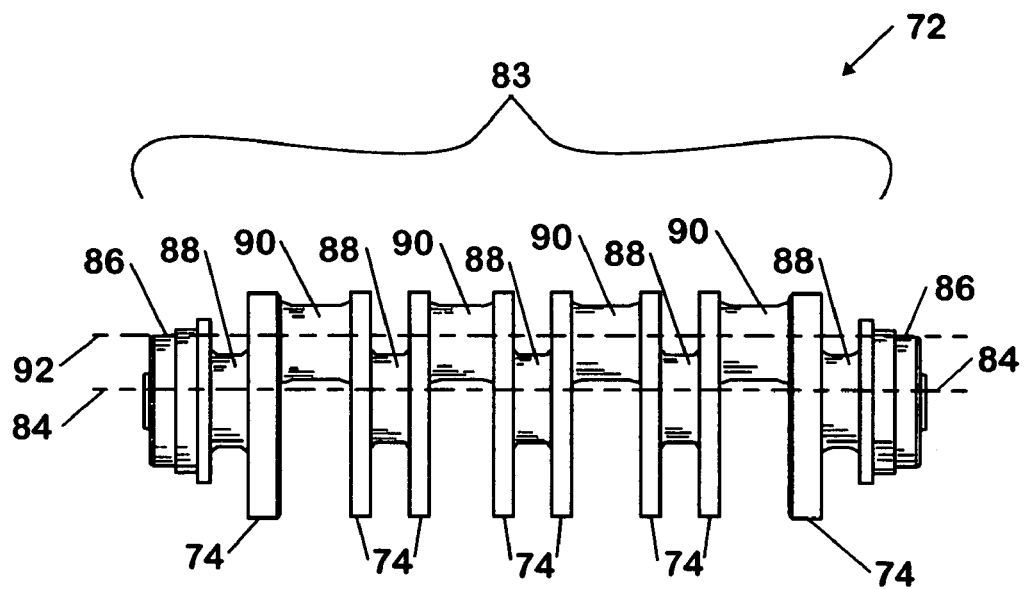
FIG. 3 is side view of a crankshaft according to the prior art.
Figure 4:
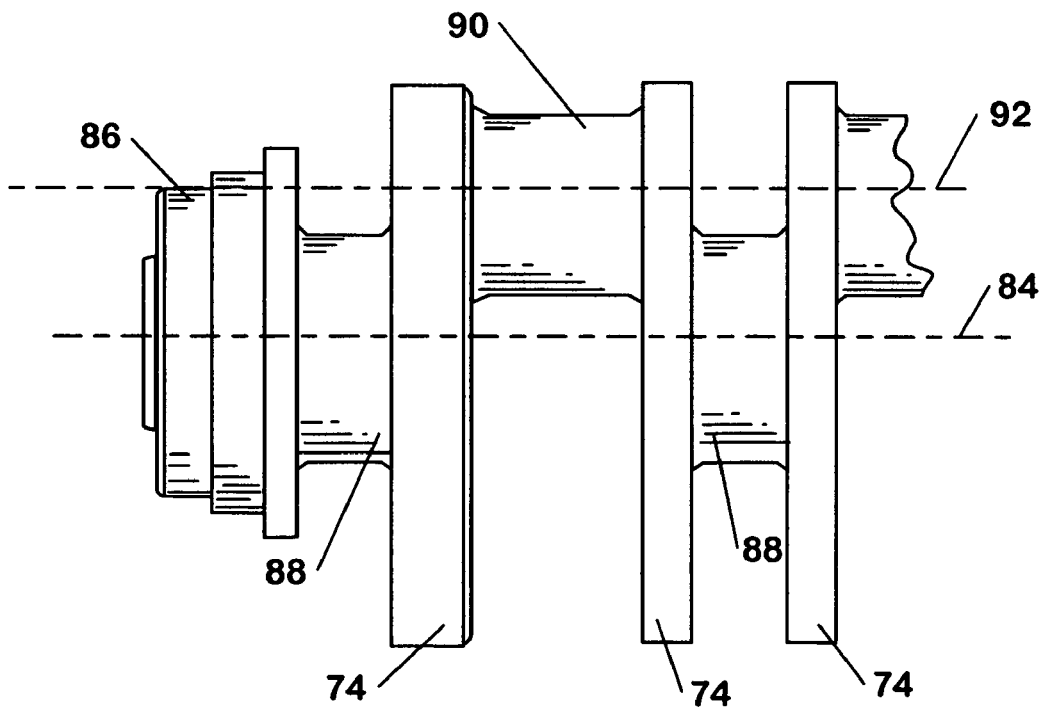
FIG. 4 is a partial side view of a crankshaft according to the prior art.

The bridge member 132 is slidably disposed on the guides 166. Each guide 166 is further disposed upon a rail 168. An elevation cylinder 162 is disposed on each bridge member 132 and configured to elevate the bridge member 132 above the guides 166 by extension of an elevation piston 154. The separation shown in FIG. 2 between the first vessel 122 and the die cavity 144 allows the actuator cylinder 162 to move the vessel 122 transverse to the cavity 144. The vessels 122, 126 are advantageously moved away from the punches 140, 142 such that the vessels 122, 126 do not interfere with the pressing process.

Figure 8:
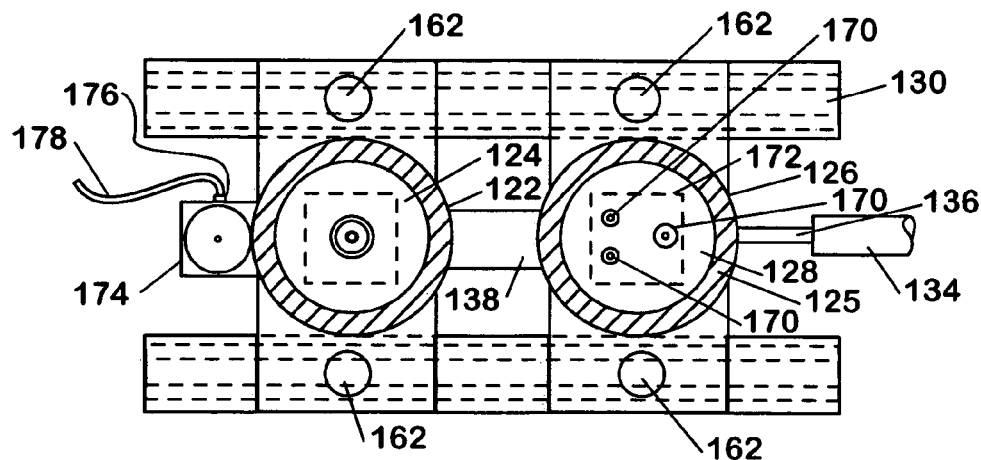
FIG. 8 is a top view of a green part forming apparatus in accordance with the present invention.

Referring to FIG. 8, a top view of the feedshoe apparatus 120 is shown. Each vessel 122, 126 is depicted in a partial cutaway to illustrate interior detail. A dashed outline of the die cavity perimeter 172 is shown for reference purposes. One or more powder egresses 170 are disposed in the bottom surface of each vessel 122, 126. The powder egresses 170 include the valves 149 for controlling the passing of the powder metal into the die cavity 144. The egresses 170 may be sized to control the relative amount of flow through a particular egress 170 during a filling operation. The first vessel 122 is shown with a single egress 170. The second vessel 126 is shown as having three egresses 170 with differing sizes. Various polygonal or eccentric shapes or varying size may be employed in place of the circular-shaped egresses without departing from the scope of the present invention.

The size and placement of the powder egresses 170 are advantageously chosen to correspond with the provision of predetermined characteristics for the finished part. The crankshaft may advantageously include counterweight material at a predetermined location of the shaft opposite the crankpins. The counterweight material may be in the form of a heavy alloy powder, such as one containing tungsten, or in the form of metal slugs introduced to the die cavity.

A conventional method for manufacturing a crankshaft is to forge the shaft and then machine it to final tolerances, as one single piece. Alternatively, the crankshaft may be formed from several component parts that are joined together as disclosed in U.S. Pat. No. 5,303,468. The apparatus and method disclosed herein provide for a powder egress advantageously positioned at the precise location for the desired counterweight material of the crankshaft.

The feedshoe apparatus shown in FIG. 8 additionally includes a liquid injection apparatus 174. The liquid injection apparatus 174 injects liquids to the first interior cavity 124 during a forming process. An inlet to the injection apparatus 176 is connected to a liquid conduit 178, which supplies a liquid solution. The apparatus may comprise a solenoid valve, such as a zero dead leg volume solenoid valve. A variety of suitable dripless valves may be used without departing from the scope of the present invention. Those of skill in the art will recognize that the present invention may also be practiced with a second liquid injection apparatus provided to the second vessel, or alternatively, one liquid injection apparatus in communication with both of the first and second vessels.

The liquid solution may include aqueous solutions, lubricants, surfactants, or activation solutions for cleaning metal particulates for cold welding. The liquid solution may also include any solution that is intended to be incorporated into the material, such as a hardener, or solvent. The injection of lubricants may be employed to reduce wear to the die cavity of the apparatus.

Figure 9:
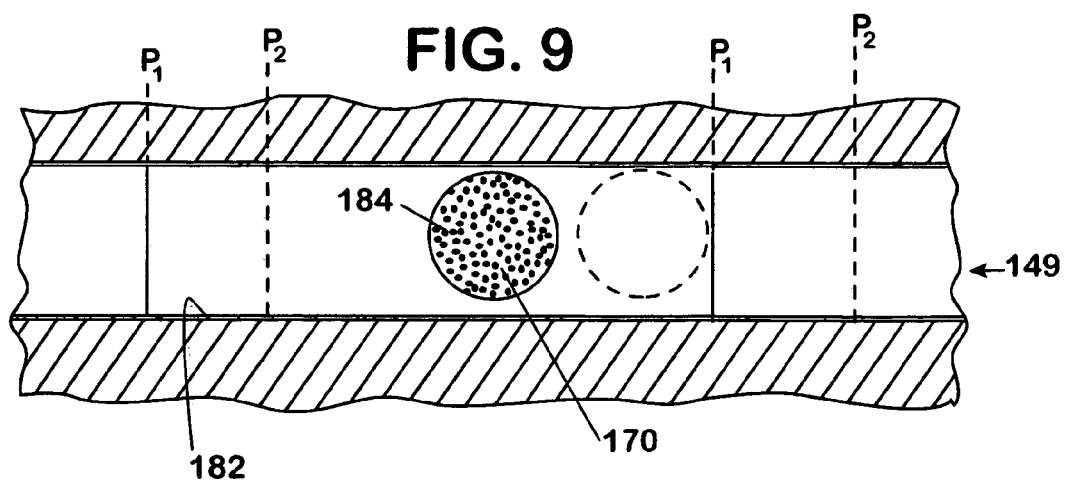
FIG. 9 is a partial top cutaway detailed view of a feed valve for a green part forming apparatus in accordance with the present invention.

FIG. 9 illustrates a valve assembly 149 that comprises the powder egress 170 of the vessel 122, 126. A housing surface 182 in conjunction with slide hole 124 define an open position $P_1$ and a closed position $P_2$ for the powder egress 170. The slide hole 184 moves between positions $P_1$ and $P_2$ as the actuator 134 linearly translates the vessel 122, 126. The open condition permits metal powder to freely exit the vessel and enter the die cavity. The closed position blocks the transfer of powder to the cavity. Other methods or devices for cutting off the flow of powder from the feedshoe to the die cavity may utilized without departing from the scope of the present invention.

Figure 10:
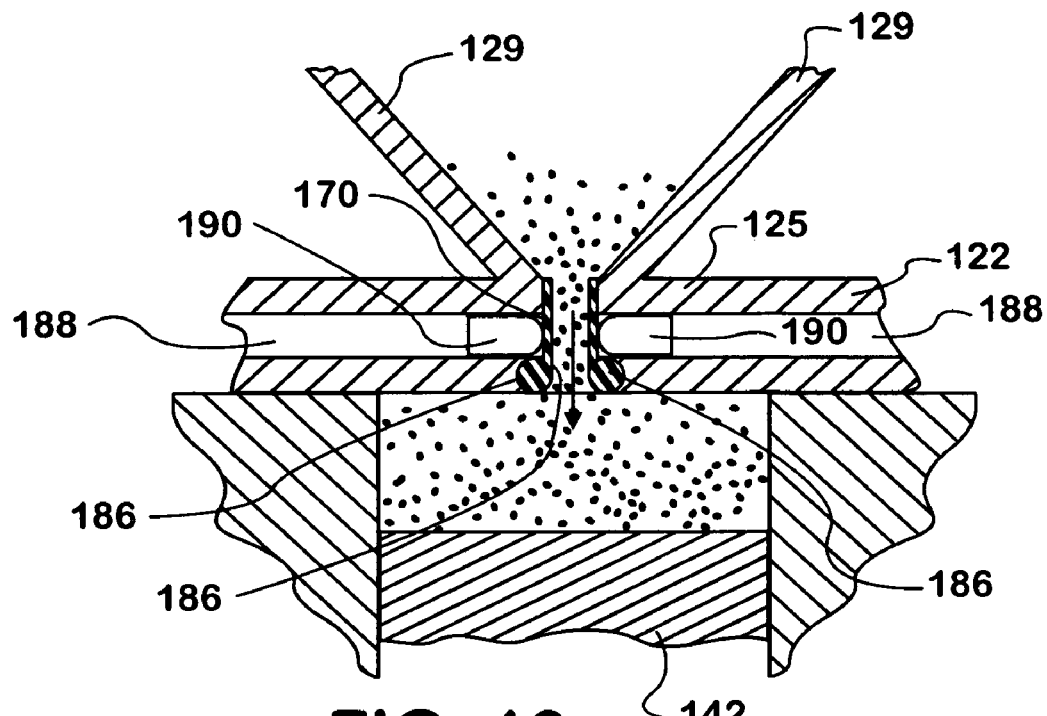
FIG. 10 is a partial cutaway side detailed view of a powder egress in the open position in accordance with the present invention.
Figure 11:
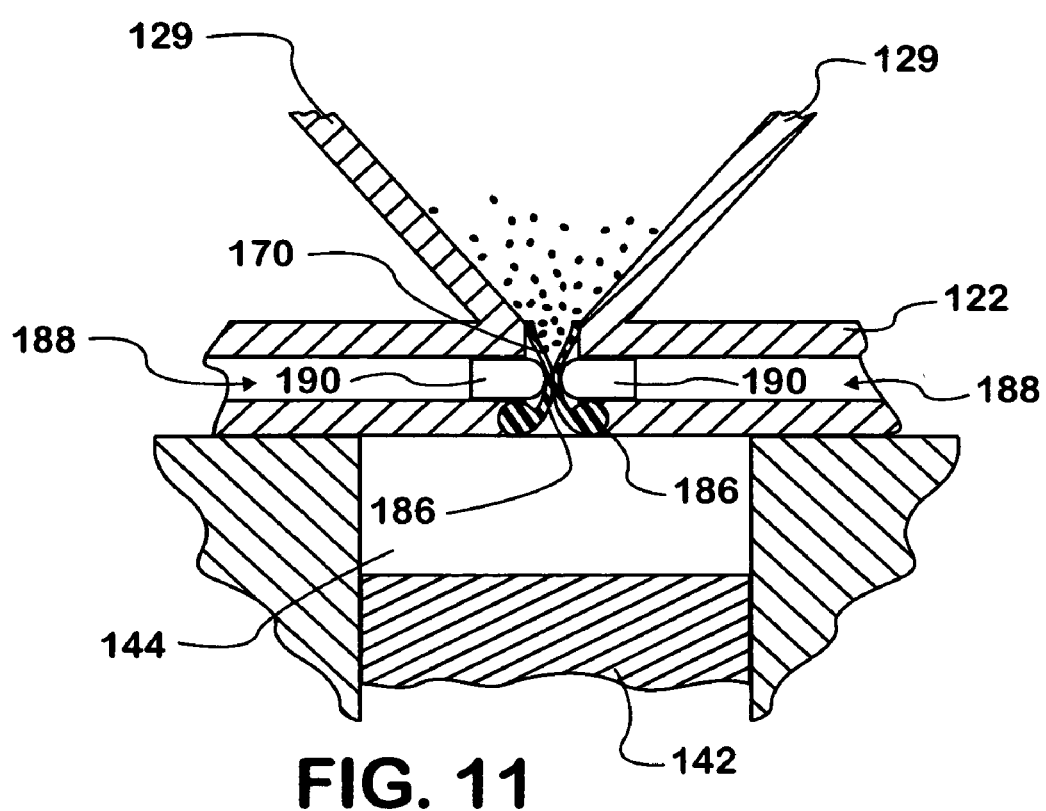
FIG. 11 is a partial cutaway side detailed view of a powder egress in the closed position in accordance with the present invention.

FIG. 10 and FIG. 11 depict an alternative embodiment of an apparatus and method for controlling the flow of metal powder into the die cavity 144. A feedtube 186 communicates between the interior cavity 124, 128 of the vessel 122, 126 and the die cavity 144. The feedtube 186 is comprised of a flexible material, such as rubber. The bottom sidewall of the vessel 122, 126 defines a channel 188 therein as shown in the figures. A pincher or crimper device 190 is disposed within the channel 188. The feedtube 186 is in the open position, as shown in FIG. 10, when the crimping devices 190 are withdrawn or not pressing on the tube 186.

FIG. 11 shows the tube 186 in a closed position wherein the crimping devices 190 press on the tube sidewalls until the sidewalls contact, thereby blocking powder flow. The crimpers 190 are urged towards the feedtube 186 by way of pneumatic control. High pressure is presented to the channel 188, which urges the crimpers 190 towards the tube 186. The removal of this high pressure condition causes the natural resiliency of the tube 186 to re-open, thereby permitting powder flow. Mechanical means, such as a linkage, may be used instead of the pneumatic drive means without departing from the scope of the present invention.

A method and apparatus for manufacturing a non-homogeneous article with powder metallurgy are described in FIG. 5 through FIG. 7 and the associated text. The following description is more particularly directed towards manufacturing a crankshaft for an internal combustion engine wherein the shaft has unitary balancing material formed as part of a single forming procedure. A first metal powder, such as tungsten or other highly dense material, is placed in the first hopper 148 and a second metal powder, such as steel or less dense material, is placed in a second hopper 150. The first vessel 122 is also centered over the die cavity 144 by either expanding or retracting the piston 136 of the actuator cylinder 134 as necessary. Alternatively, the first powder may be heavy metal (dense) slugs delivered to the mold cavity. Those of skill in the art will recognize that a variety of materials may be used without departing from the scope of the present invention.

The first metal powder is introduced to the first interior cavity 124. The first powder fills the mold or die cavity 144 through the powder egress 170 with a predetermined amount of powder to form the weighted sections of the shaft. The flow of first powder is stopped by the valve 149 at the powder egress 170. The piston 136 is extended until the second vessel 126 centers over the die cavity 144. Note that the powder egress 170 is advantageously not centered over the die cavity, allowing the second powder to deposit at the desired discrete locations where the shaft material is formed. A predetermined amount of the second powder is filled into the die cavity 144.

The piston 136 is retracted until the first vessel 122 is clear of the upper 140 and lower 142 punches. The powder in the die cavity 144 is pressed to form a green part, advantageously once the clearance has been established. The green part is placed in a sintering oven and cooled. The cooled sintered crankshaft 280 is machined to final tolerances. The machining operations may refine the balance imparted to the shaft by removing some of the counterweight material until desired characteristics are achieved. Other secondary operations may be performed without departing from the scope of the present invention. A finished crankshaft 280 results from the completion of any other secondary operations.

Figure 12:
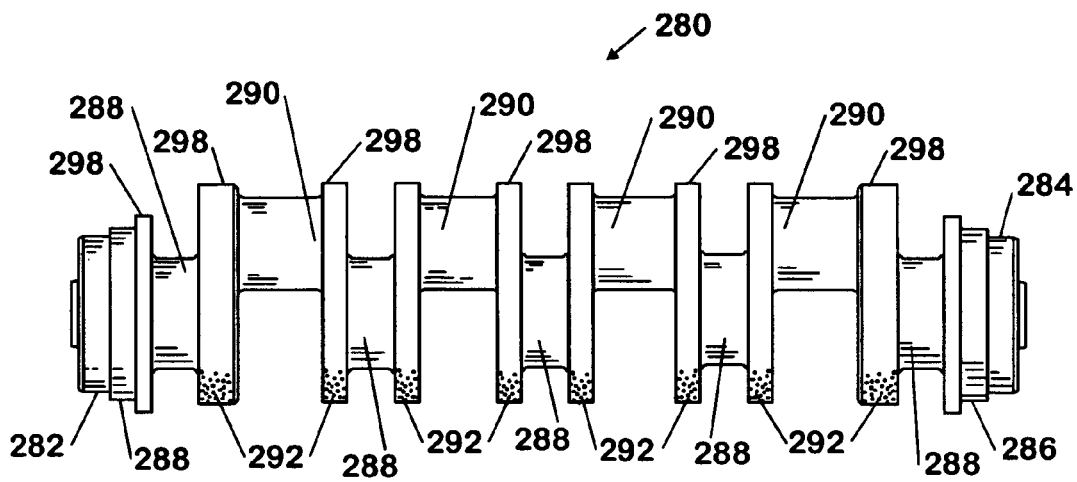
FIG. 12 is a side view of a non-homogeneous crankshaft formed by powder metallurgy in accordance with the present invention.
Figure 13:
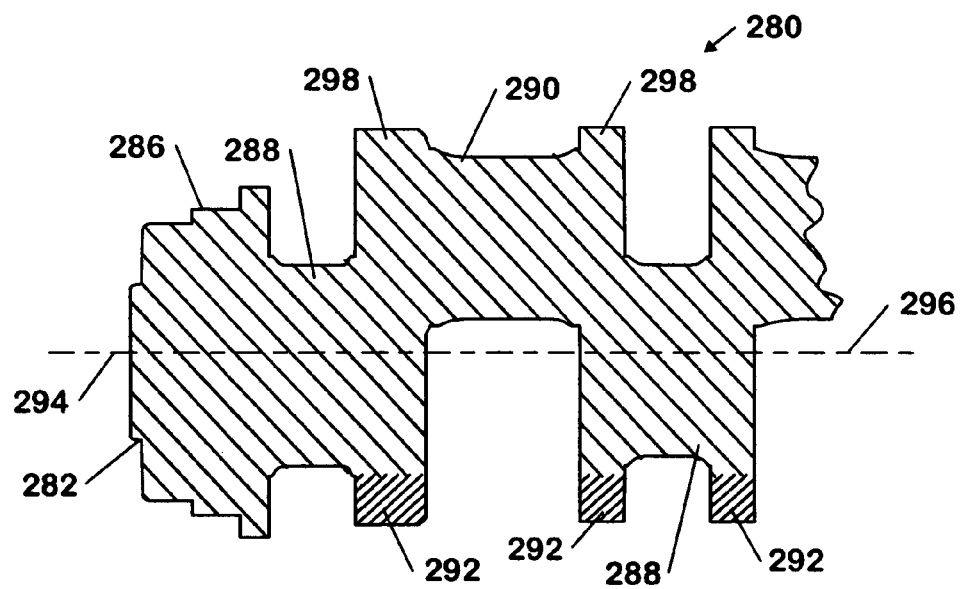
FIG. 13 is a partial cutaway view of the crankshaft of FIG. 12.

A crankshaft 280 is shown in FIG. 12 and FIG. 13. The crankshaft 280 comprises a crankshaft body having a first end 282, and a second end 284. A plurality of spacers 298 and journals 286, 288, 290 are disposed between the first and second ends 282, 284. The first end 282 and the second end 284 each include a main bearing journal 286. Spacers 298 separate a plurality of bearing journals 288 and crankpin journals 290. The number of pistons in the engine dictates the number of journals 288, 290, and spacers 298. Each journal 286, 288, 290 forms a hydrodynamic bearing with a respective bearing surface when rotating with an oil film between respective surfaces. The width of the spacers 298 will vary based upon clearance of other engine components, such as the bore of the block.

The ends 282, 284, crankpin journals 290, and bearing journals 286, 288 are comprised of the second material, such as steel. The spacers 298 are also partially comprised of the first material. The spacers 298 may include a counterweight material portion 292 comprised of the first material. The first material is advantageously heavier (more dense) than the second material in order to provide a counterweight in the shaft. The first material may be tungsten. Those of skill in the art will recognize that different materials of varying densities may be used without departing from the scope of the present invention.

The counterweight material portion 292 is advantageously located opposite respective crankpin journals 290 in order to offset moments that may be otherwise generated. Such offset material portion 292 allows the rotational axis 294 to be the same axis as the balance axis 296. The counter-weighting portion 292 may be fine-tuned by machining to achieve a desired balance characteristic. Those of skill in the art will recognize that the counterweight material may be provided to other portions of the shaft, such as the journals, separately or instead of the spacers, without departing from the scope of the present invention.

Figure 14:
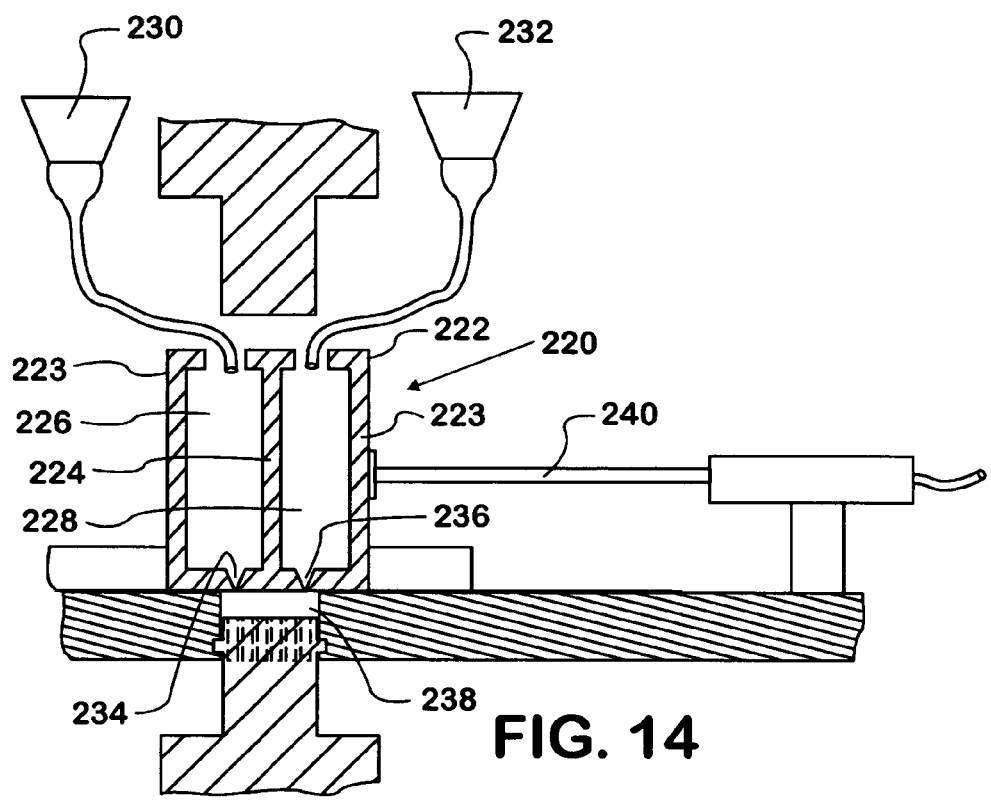
FIG. 14 is a side cutaway view of the green part forming apparatus in accordance with the present invention.

FIG. 14 depicts an alternative apparatus for forming a green part in accordance with the method of FIG. 6. The feedshoe apparatus in accordance with this embodiment comprises a single vessel 222. The vessel 222 comprises sidewalls 223 and a center divider 224. The sidewalls 223 and center divider 224 define a first section or chamber 226 and a second section or chamber 228. The first section 226 receives a first metal powder from a first hopper 230 and the second section 228 receives a second metal powder from a second hopper 232. A first powder egress 234 is provided to the first chamber 226 and a second powder egress 226 is provided to the second chamber 228.

In operation, the first and second powders 200, 202 may be provided to the die cavity at the same time. The respective powder egresses 234, 236 are located and sized to promote the filling of the cavity 238 with the first and second powders in their desired locations before pressing. Alternatively, the piston 240 may move the vessel 222 in a linear direction to place a respective first 234 or second 236 egress over a portion of the die cavity 238 prior to filling with a respective metal powder 200, 202. As a further alternative, the powder egresses 234, 236 may be selectively opened and closed to create density gradients in the part or to further place a first material 200 within the second material 202. Additionally, a combination of the above alternatives may be employed as part of the same forming operation.

Figure 15:
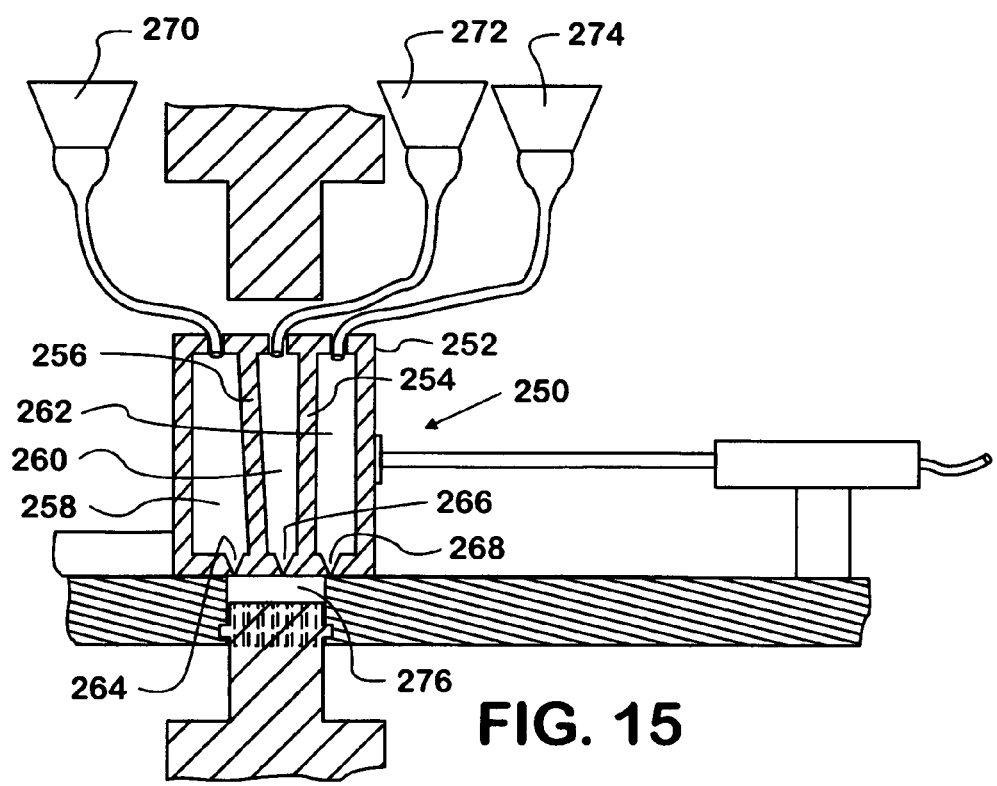
FIG. 15 is a side cutaway view of the green part forming apparatus in accordance with the present invention.

FIG. 15 depicts another alternative embodiment of the green part forming (feedshoe) apparatus 250. This embodiment again comprises a single vessel 252. The vessel comprises first 256 and second 254 dividers for defining a first chamber or section 258, a second chamber 260, and a third chamber 262. Each chamber 258, 260, and 262 receives a respective first 264, second 266, or third 268 powder egress and is in communication with a respective first 270, second 272, or third 274 hopper. Those of skill in the art will appreciate that the present invention may be practiced with more than three chambers without departing from the scope of the present invention. Moreover, a single hopper may be in communication with two or more chambers.

The use of three chambers 258, 260, and 262 allows a first of two different powders to be introduced to the die cavity 276 in two places simultaneously. Alternatively, the three chambers 258, 260, and 262 allow three different density powders to be introduced to the die cavity 276 as part of a single forming operation. The embodiment of FIG. 15 is operated in substantially the same manner as set forth above for the two-chamber embodiment.

The above process is performed to provide a component with dissimilar characteristics at discrete locations in the part. For example, the crankshaft for an internal combustion engine may be provided with discrete balancing weights by way of the forming operation. The method provides for a balanceable crankshaft with lower mass and machining costs. This method of manufacturing a crankshaft provides the ability to minimize crankshaft size. Other advantages include minimizing manufacturing steps, cost, time, labor, and complexity, and minimizing the offset between the axis of rotation and the axis of balance.

Although the present invention has been described with reference to the above embodiments, those skilled in the art will recognize changes may be made in form and detail without departing from the spirit and scope of the invention. The described embodiments are to be considered in all respects only as illustrative and not restrictive. The scope of the invention is, therefore, indicated by the appended claims rather than by the foregoing description.

What is claimed is:

1. An apparatus comprising:
  a non-homogenous one piece crankshaft unitarily formed in a powder metallurgy process,
  wherein the crankshaft has a crankshaft body, wherein the crankshaft body has a first end and a second end, and a plurality of spacers and journals disposed between the first end and the second end, wherein the crankshaft body is formed of a first sintered material having a known density, and
  wherein the crankshaft has at least one counter weight having a second sintered material of different density than the first material and formed integral with the first material.

2. The apparatus of claim 1, wherein the second material is of greater density than the first material.

3. A crankshaft comprising:
  a one piece crankshaft body having a first end, a second end, and a plurality of spacers and journals disposed between the first end and the second end, wherein the crankshaft body is formed of a first material having a first density;
  at least one counter weight formed of a second material of different density than the first material and formed integral with the first material;
  wherein the crankshaft comprises a non-homogenous structure unitarily formed in a powder metallurgy process;
  wherein the first material is formed from a first powdered metal constituent and the second material is formed from a second powdered metal constituent.

4. The crankshaft of claim 3, wherein the second material is of greater density than the first material.

5. An internal combustion engine comprising:
  a one piece crankshaft comprising a sintered metal main body comprising a plurality of spacers and journals disposed between opposite lengthwise ends, and
  at least one sintered metal counterweight having a material density greater than the material density of the main body and integrally joining with the main body.

* * * * *